H. STEPHENSON, W. THOMPSON & W. G. BLAKE.

F. W. GRIFFITH & G. P. BYRNE, Assignees.

PRINTING TYPE.

No. 7,342. Reissued Oct. 10, 1876.

Witnesses.
Alfred Shedlock.
William Shedlock

Inventors.
Henry Stephenson
William Thompson
and
William G. Blake.

Assees
Frederick W. Griffith
Geo. P. Byrne.
Assgs.
per E. N. Johnson
Atty.

JAMES R. OSGOOD & CO. BOSTON.

UNITED STATES PATENT OFFICE.

HENRY STEPHENSON, WILLIAM THOMPSON, AND WILLIAM G. BLAKE, OF SHEFFIELD, ENGLAND, ASSIGNORS TO FREDERICK W. GRIFFITH AND GEORGE P. BYRNE.

IMPROVEMENT IN PRINTING-TYPES.

Specification forming part of Letters Patent No. 101,535, dated April 5, 1870; antedated March 18, 1870; reissue No. 7,342, dated October 10, 1876; application filed May 5, 1876.

*To all whom it may concern:*

Be it known that HENRY STEPHENSON, WILLIAM THOMPSON, and WILLIAM GREAVES BLAKE, of Sheffield, England, invented certain Improvements in Type for Printing Type-Ribbon, of which the following is a specification:

The said invention relates to type for printing what is technically known as "type-ribbon;" and it consists in a novel construction, combination, and arrangement of parts, which have for their object a set of type by which a number of various designs in type-ribbon may be printed by variously arranging or combining in a form, with or without ordinary letter-type, said type, as will be fully hereafter set forth.

Figure 1:
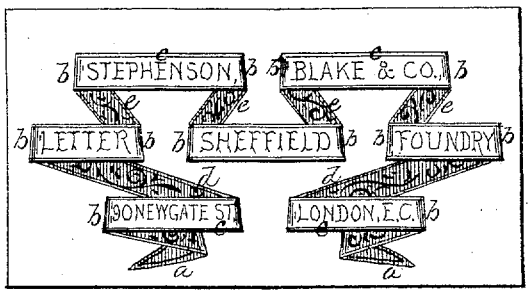
Figure 2:
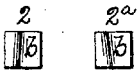
Figure 3:
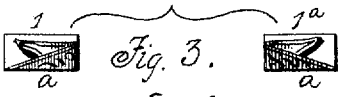
Figure 4:
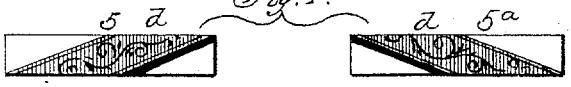
Figure 5:
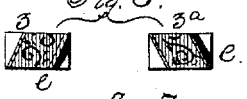
Figure 7:
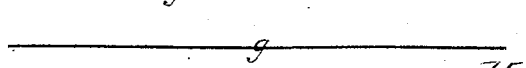
Figure 6:
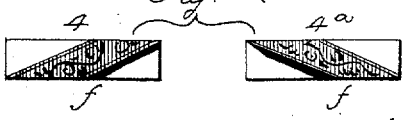

Figure 1 is a view of a complete type-ribbon, printed on a card, and with an advertisement printed thereon. Fig. 2 is a face view of the type for producing the shading at the ends of each plane length of ribbon. Fig. 3 is a face view of the type for producing the ends of the ribbon. Fig. 4 is a face view of the sections for producing long diagonals for connecting parallel lengths of the ribbon, while Fig. 5 is a similar view of type for short diagonals for similar purposes. Fig. 6 is a face view of type forming diagonals intermediate between the diagonals Figs. 4 and 5. Fig. 7 is an edge view of the rules for making the lines which unite the shading-sections and form the face of the ribbon.

The drawing, Fig. 1, is a representation of a ribbon arranged in space, and folded back and forth, so as to represent two or more parallel lengths of plane surfaces, with intervals between, one above another, and connected together by diagonals, and having waving terminals or ends. This illustrates one combination of the type, in which it will be observed four elementary parts enter, viz: The lines *c*, which form the body or face of the ribbon; shading-sections *b b*, to be used at the extremities of each straight length of ribbon; diagonal sections *d e*, for connecting parallel lengths of the ribbon, and terminal sections *a a*, which represent the waving ends of the ribbon.

It will be seen that the diagonals represent the back of the ribbon.

The manner in which the type here represented are combined and arranged with letter-type to produce the print represented in Fig. 1, is as follows: The sections 1 1ª form the parts, *a* representing the waving ends or terminals of the ribbon. 2 2ª form the shading at the turns *b* of these waving ends to the plane parts *c*, similar sections being used at all the other turns *b*. 5 5ª represent the type for the long diagonals *d*, between the lower and next row of plane surfaces. 3 3ª are the type for the short diagonals *e*, between the middle and upper rows of plane surfaces. 4 4ª represent medium diagonal type *f*, which may be substituted for either the long or short ones, or other intermediates, or longer or shorter diagonals may be used, as desired.

The straight lines *g*, Fig. 7, represent the edges of the rules which form the connection between the type forming the ends of the ribbon or of each fold or length of it. Between the rules *c c* the letter-type is set up as usual.

Instead of letter-type it is obvious that ornamental type may be used between the rules, which would print a ribbon having an ornamented face, or a plain or an ornamental rule of the width of the face of the ribbon may be used to connect the terminal sections.

As many duplicates of these type as may be required for the number of planes, folds, diagonals, and terminations made in one print may be used in one form.

It is obvious that the type may be combined in a design in which the diagonals would not enter—that is, where a single straight length of ribbon is represented with its ends or terminals folded back.

We claim—

1. The combination of the rule *g* for printing the representation of a straight length of ribbon, and the type for printing the extremities and turns of such plane length of ribbon, substantially as described and specified.

2. The type herein described, for printing type-ribbon, consisting of the shading-sections 2 2ª, the rules *g g* connecting them, and representing the face of the ribbon, and the terminal or diagonal sections 1 1ª 5 5ª, constructed, combined, and arranged substantially as described and specified.

3. The type 1 1ª to form the terminal *a*, 2 2ª to form the shadings *b*, 5 5ª to form long diagonals *d*, 3 3ª to form short diagonals *e*, and 4 4ª to form intermediate diagonals *f*, all located in a form and combined with thick and thin metal rules *g g*, as and for the purpose specified.

4. The combination, with the type herein described for printing type-ribbon, of letter-type for printing on the representation of the face of the ribbon, substantially as described and specified.

FREDERICK WM. GRIFFITH.
GEO. P. BYRNE.

Witnesses:
F. A. VAN DYKE,
ALBT. VAN DYKE.